(12) United States Patent
Lutz et al.

(10) Patent No.: US 6,416,079 B1
(45) Date of Patent: Jul. 9, 2002

(54) KNEE-RETAINING DEVICE FOR A VEHICLE

(75) Inventors: Joachim Lutz, Schechingen; Dirk Schultz, Schwäbisch Gmünd, both of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/743,142

(22) PCT Filed: Jul. 20, 1999

(86) PCT No.: PCT/EP99/05177

§ 371 (c)(1),
(2), (4) Date: Jan. 5, 2001

(87) PCT Pub. No.: WO00/05105

PCT Pub. Date: Feb. 3, 2000

(30) Foreign Application Priority Data

Jul. 20, 1998 (DE) ..................................... 298 12 892 U
Feb. 5, 1999 (DE) ..................................... 299 02 032 U

(51) Int. Cl.[7] ........................ B60R 21/045; B60R 21/22
(52) U.S. Cl. ..................................... 280/730.1; 280/753
(58) Field of Search ............................. 280/730.1, 732, 280/751, 752, 753, 728.3

(56) References Cited

U.S. PATENT DOCUMENTS 4,198,075 A    4/1980  Kob et al.
5,308,111 A    5/1994  Sommer
5,536,043 A  * 7/1996  Lang et al. ............... 280/730.1
5,615,914 A    4/1997  Galbraith et al.
5,931,493 A  * 8/1999  Sutherland ............... 280/730.1

FOREIGN PATENT DOCUMENTS

DE    3934588      2/1994
DE    29710745    11/1997

* cited by examiner

Primary Examiner—Peter C. English
(74) Attorney, Agent, or Firm—Tarolli, Sundheim, Covell, Tummino & Szabo L.L.P.

(57) ABSTRACT

A knee restraint device for vehicles has a base, a knee protector component which is movable toward the knees of a vehicle occupant, and a drive structure for driving the knee protector component toward the knees of a vehicle occupant. The drive structure is arranged between the base and the knee protector component. Further, a limiting- and positioning structure is provided for limiting the travel of the knee protector component towards the knees of a vehicle occupant and for positioning the knee protector component relative to the knees of a vehicle occupant. The limiting-and positioning structure is fastened to the base and is constructed in one piece with the knee protector component. The limiting-and positioning structure is deformable on activation of the drive structure and has a predetermined rigidity, this rigidity-being sufficient so as to prevent any change in shape of the limiting-positioning structure under its weight.

11 Claims, 5 Drawing Sheets

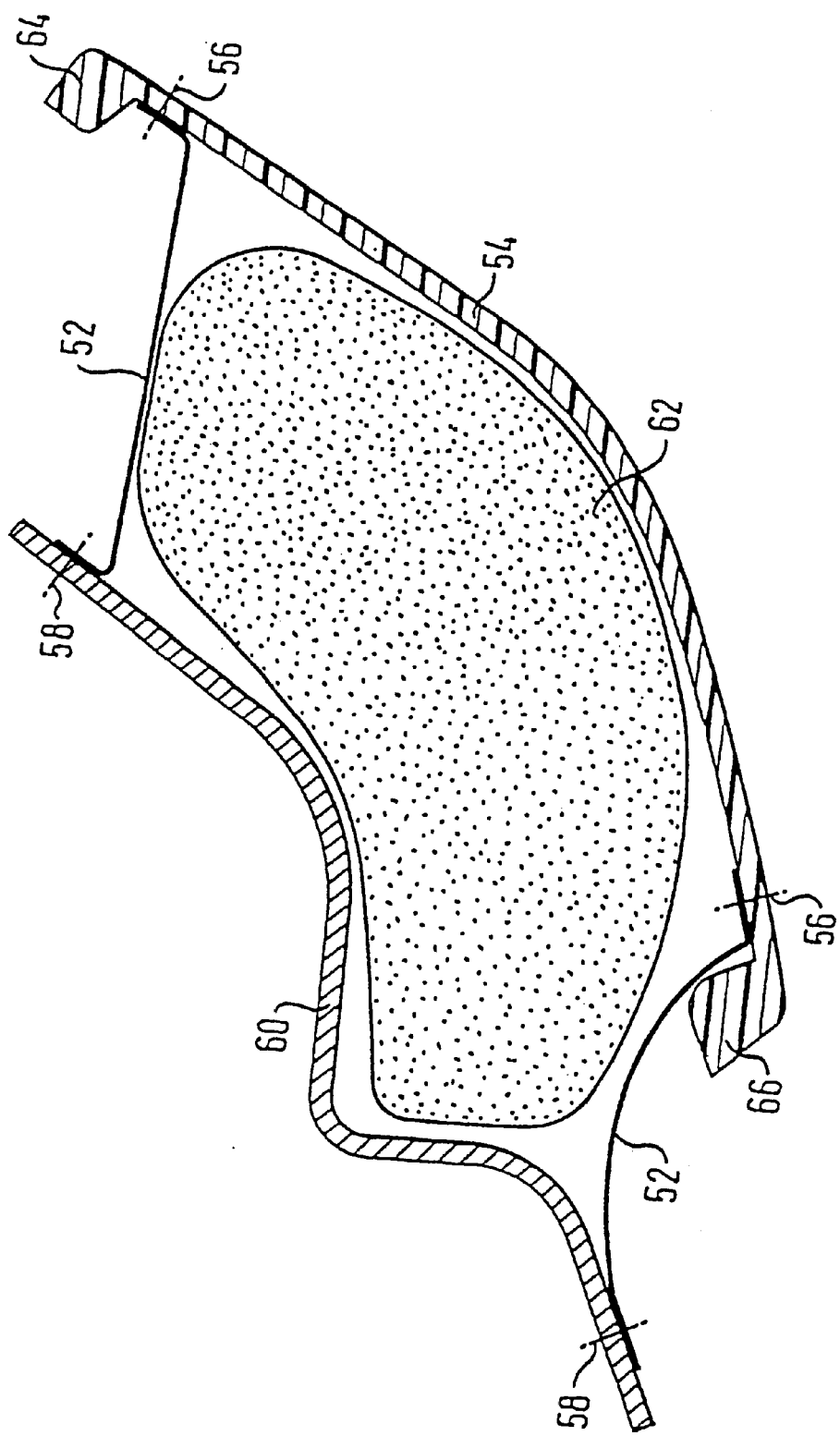

KNEE-RETAINING DEVICE FOR A VEHICLE

BACKGROUND OF THE INVENTION

The invention relates to a knee restraint device for vehicles, with a base, a knee protector component which is movable toward the knees of a vehicle occupant, a drive means which is arranged between the base and knee protector component, and limiting-and positioning means fastened to the knee protector component and the base.

A generic knee restraint device is known for example from the published European Application EP-A-0684164. The knee restraint device described there has a knee protector plate which is movable by a gas bag toward the knees of a vehicle occupant. The gas bag is able to be filled by a gas source and is arranged between the base and the knee protector plate. Limiting straps are fastened on the one side to the knee protector plate and on the other side to the base. Limiting straps and knee protector plate are provided as separate components. The limiting straps which are used consist of a polyester or nylon belt and are arranged inside the gas bag. Fastenings which are able to be torn out are provided for fastening the knee protector plate to an instrument panel in the state of rest of the knee restraint device.

A further knee restraint device is known from DE-U-29710745.

The production of a knee restraint device for vehicles is to be simplified by the invention.

BRIEF SUMMARY OF THE INVENTION

According to the invention, a knee restraint device for vehicles is provided for this with a base, a knee protector component which is movable toward the knees of a vehicle occupant, a drive means which is arranged between the base and the knee protector component, and limiting-and positioning means fastened to the knee protector component and the base, in which the limiting-and positioning means have a predetermined rigidity, so that they do not undergo any change in shape at least under the influence of their own weight force, but are deformable on activation of the drive means, the limiting-and positioning means being constructed in one piece with the knee protector component. Through these measures, the production of the knee restraint device is simplified, because the alignment and fastening of the limiting-and positioning means to the base and to the knee protector component, in contrast to flexible textile bands, is easy to bring about. It is also ensured that in operation of the vehicle, no rattling or striking of the limiting-and positioning means themselves occurs. As limiting-and positioning means, for example limiting straps or guide arms can be used. The knee protector component and/or limiting-and positioning means can be produced for example from plastic or plastic injection molding, metal or metal injection molding, sheet metal, plastic/fabric composite or else metal/rubber composite. Through the construction of the limiting-and positioning means in one piece with the knee protector component, components are saved compared with knee restraint devices according to the prior art, which simplifies production and makes it cheaper. With an embodiment in a single piece, no positioning and no arranging of limiting-and positioning means against the knee protector component is necessary, a manufacturing step which requires a high degree of accuracy so as not to endanger operability of the knee restraint device.

In further development of the invention, the limiting- and positioning means have at least one limiting strap, and the at least one limiting strap and the knee protector component are produced from a single material blank. Hereby, the knee protector component and the limiting straps can be produced quickly and simply. The limiting straps and the knee protector component can be produced for example from sheet metal, plastic or else plastic with a textile insert.

Advantageously, the material blank has formed-on material tongues which form the limiting straps. After cutting the material to size, the material tongues are folded into a position necessary for the installation of the knee restraint device.

The production of the limiting- and positioning means and of the knee protector component from a single rectangular material blank is particularly advantageous, in which the limiting- and positioning means are constructed as regions of the rectangular material blank which are separated from the knee protector component by perforation lines. The shape of the sheet metal blank is further simplified thereby and the length of any sharp edges of cut which are to be machined is reduced.

As a further step, the perforation lines are formed by oblong holes. In the course of unfolding and in particular shortly before reaching the final position of the knee protector component, the material surrounding the oblong holes expands, so that these are given an approximately round shape. Thereby, for example, the stressing of the limiting- and positioning means on reaching the final position can be diminished.

It is advantageous if in the knee restraint device for vehicles, according to the invention, the limiting- and positioning means have a rigidity which is sufficient to keep the knee protector component in a position of rest. When the knee protector component is kept in a position of rest by the limiting- and positioning means, components can be saved or the production can be simplified, because no fastenings of the knee protector component which are able to be torn out are required on a rear fastening plate, for example clips or tear seams.

It is likewise advantageous that the limiting- and positioning means are plastically deformable. In this way, the knee protector component can be held in its position of rest by the limiting- and positioning means, and after activation of the drive means the knee protector component can be moved toward the occupant's knees against the deformation resistance, to be dimensioned accordingly, of the limiting- and positioning means.

In further development of the invention, the limiting- and positioning means in the plastically deformed state have a rigidity which is sufficient to keep the knee protector component in a position reached after having protected the knees of a vehicle occupant. Also after the end of the restraint process, the knee protector component is thereby held in its final position, which presents advantages with regard to the secondary crash behavior of the knee restraint device. By an undefined position of the knee protector component after the primary crash being avoided, a damage to the lower extremities of the vehicle occupant in the secondary crash can be reduced.

Advantageously, the limiting straps are constructed as sheet metal strips and the knee protector component is constructed as a plastic plate. It is likewise advantageous when the limiting straps are constructed as sheet metal strips and the knee protector component is constructed as an aluminum plate. The fastening of the limiting straps to the base can take place for example by means of penetrating joints, welding or riveting. The fastening of the limiting straps to the plastic plate or to the aluminum plate can take place by means of penetrating joints or riveting, but also by injecting or molding during the production of the plastic or aluminum plate. By a light plastic or aluminum plate being selected, a rapid and low-delay response of the knee restraint device can be ensured. Sheet metal strips are able to be produced simply and practically without a waste of material and can be folded or bent to achieve an optimum structural space. In order to prevent damage to a gas bag serving as drive means and injuries to the occupants, the edges of the sheet metal strips can be deburred or rounded. In order to keep the limiting straps in a folded state during assembly and in the state of rest of the knee restraint device, the limiting straps can be pre-fixed in the folded state, for example by penetrating joints, welding or riveting of material layers of the limiting straps lying one over another or by penetrating joints, welding or riveting of limiting strap sections with the base and/or with the knee protector component. This pre-fixing is then released on activation of the knee restraint device.

BRIEF DESCRIPTION OF THE DRAWINGS

Further features and advantages of the invention will be inapparent from the following description and from the drawing to which reference is made. In the drawing.

FIG. 8 shows a sectional view of the knee restraint device of FIG. 7 in activated state.

DETAILED DESCRIPTION OF THE INVENTION

Figure 1:
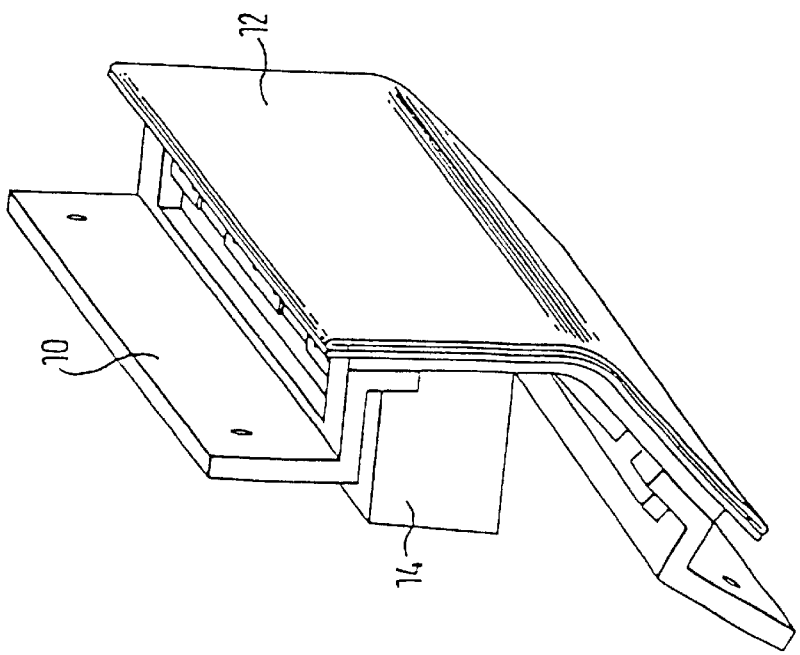
FIG. 1 shows a perspective view of the knee restraint device according to the invention, in a state of rest.

The knee restraint device illustrated in FIG. 1 has a base 10 and a knee protector plate 12. The knee protector plate 12 is part of an interior panel or of a glove compartment of a vehicle (not illustrated) and can be arranged on the driver's or passenger side of a vehicle. For this, the base 10 is fastened to a vehicle structure or to a glove compartment (not illustrated). The knee protector component can be provided with a plastic covering or a lining, which is adapted to the interior lining of the vehicle. In FIG. 1, a gas bag module 14 is illustrated only diagrammatically, consisting of a gas generator and a gas bag. In the case of a vehicle impact, the gas bag module 14 is activated, whereupon the gas bag unfolds toward the knee protector plate 12.

Figure 2:
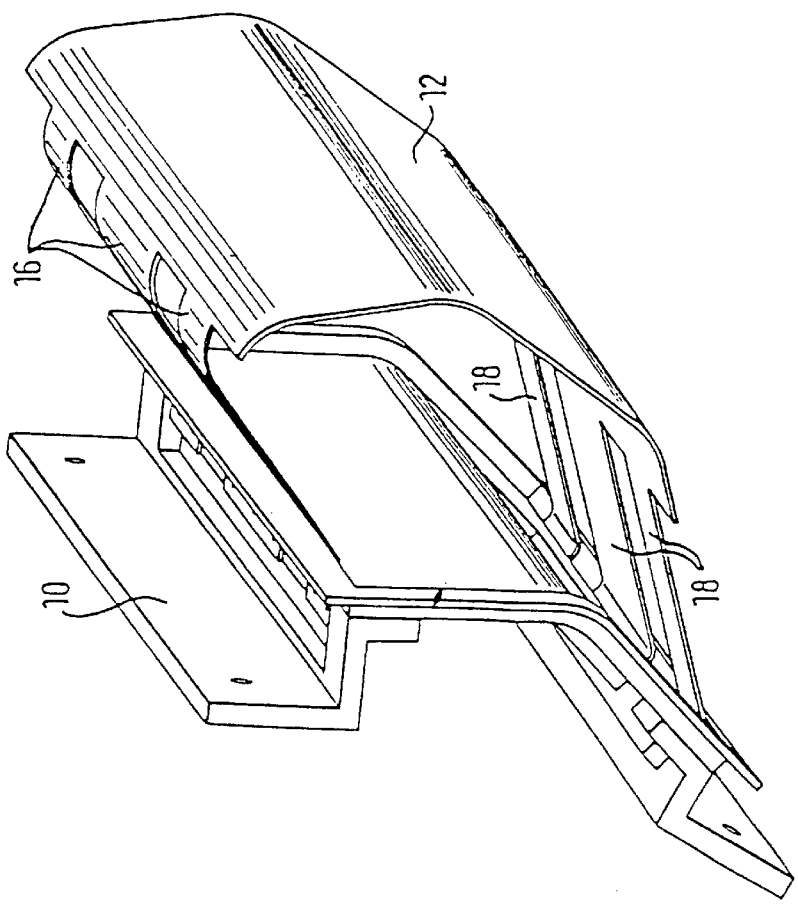
FIG. 2 shows the knee restraint device of FIG. 1 in activated state.
Figure 4:
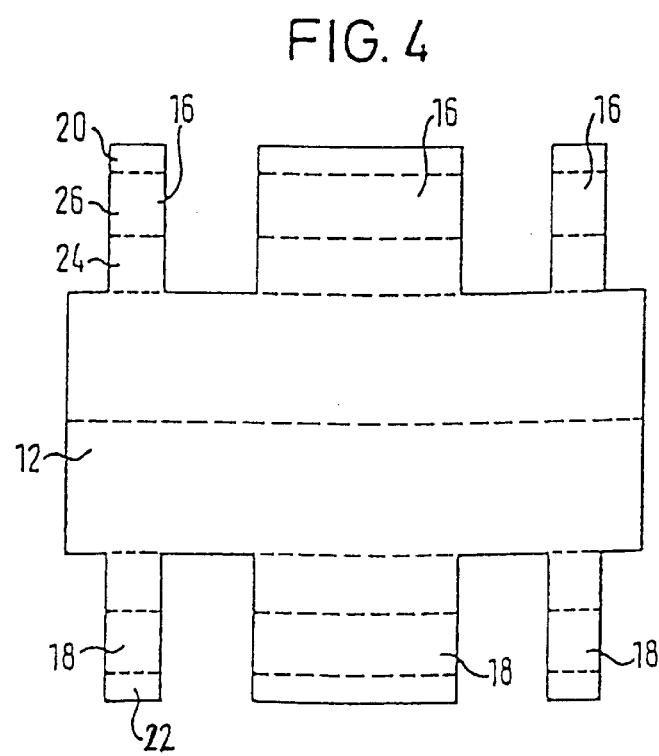
FIG. 4 shows a top view onto the material blank used for the production of the knee protector plate and of the limiting straps of FIGS. 1 to 3.

This activated state of the knee restraint device is illustrated in FIG. 2, the gas generator and gas bag not being illustrated, for the sake of clarity. By means of the unfolding gas bag, the knee protector plate 12 is pushed away from the base 10. The path of movement of the knee protector plate 12 during the unfolding process can be controlled here by the upper limiting straps 16 and the lower limiting straps 18, which connect the knee protector plate 12 with the base 10. The gas bag, provided as drive means, therefore does not have to fulfill any guiding function for the knee protector plate 12 and can thereby lie loosely against the knee protector plate 12. As can be seen in FIG. 2, the limiting straps 16 or respectively 18 and the knee protector plate 12 are constructed in one piece, and they are produced from a single sheet metal blank which is illustrated in FIG. 4. A separate fastening of the limiting straps 16 or respectively 18 to the knee protector plate 12 can thereby be eliminated.

Figure 3:
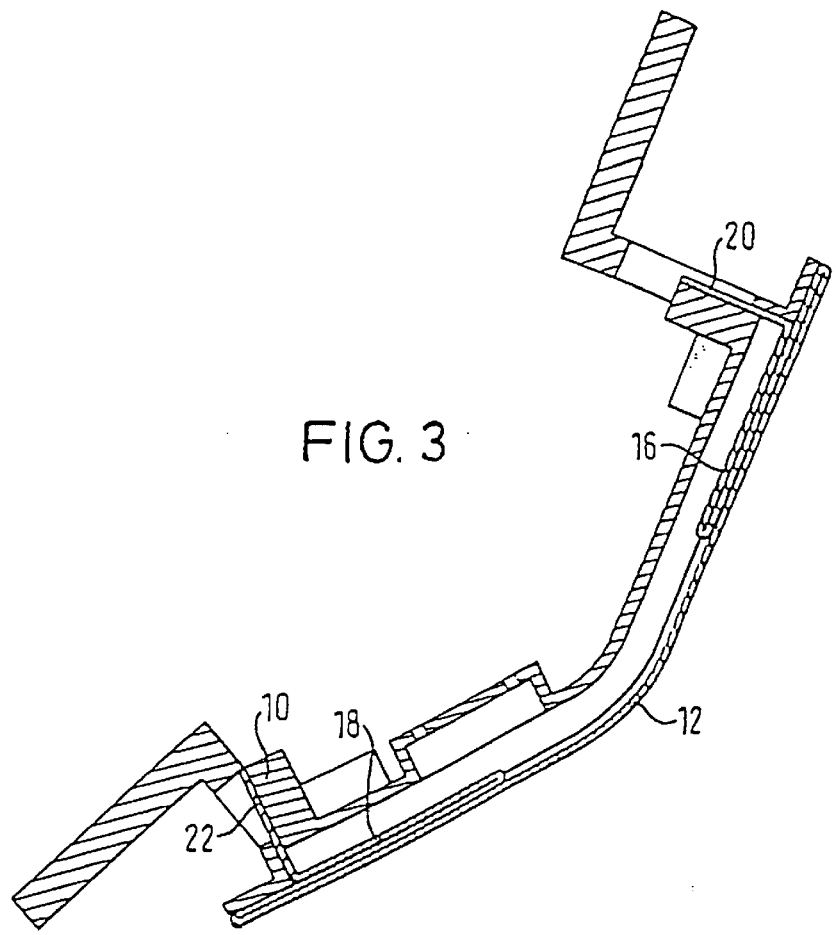
FIG. 3 shows a sectional view of the knee restraint device of FIG. 1.

As illustrated in the sectional view of FIG. 3, the limiting straps 16 or respectively 18 are folded on the reverse side of the knee protector plate 12 and fastened in the region of a fastening section 20 or respectively 22, extending perpendicularly to the knee protector plate 12, to the base 10, for example by screws. The limiting straps 16 or respectively 18 have in the folded state illustrated in FIG. 3 a rigidity which is sufficient to keep the knee protector plate 12 during normal operating conditions of a vehicle in abutment against the base 10, i.e. in the position of rest. The necessary rigidity of the folded limiting straps is realized by the limiting strap material itself or a suitable connection of the limiting strap sections with each other, e.g. by penetrating joints. Therefore, no additional tear seams or holding clips able to be torn out are necessary between knee protector plate 12 and base 10, in order to keep the knee protector plate 12 in the position of rest shown in FIGS. 1 and 3.

On activation of the gas bag module, the gas bag unfolds between base 10 and knee protector plate 12, whereby the limiting straps 16 or respectively 18 are unfolded and stretched. In so doing, the folded sheet metal strips which form the limiting straps 16 or respectively 18 are plastically deformed by being bent up. After reaching the final position of the knee protector plate 12, which is illustrated in FIG. 2, the limiting straps 16 or respectively 18 prevent a further movement of the knee protector plate 12 toward the knees of a vehicle occupant.

On impact of the knees of a vehicle occupant, the knee protector plate 12 is then moved again toward the base 10, with gas flowing out from the gas bag lying between base 10 and knee protector plate 12, and energy being converted. The protective movement of the knee protector plate 12 ends when the vehicle occupant falls back into the seat again after completion of the impact. The knee protector plate 12 is then situated in an intermediate position which lies between the extreme positions shown in FIGS. 1 and 2. Also in this intermediate position, the rigidity of the now already plastically deformed limiting straps 16 or respectively 18 is sufficient to keep the knee protector plate 12 in its intermediate position which it has reached. The knee protector plate 12 thereby remains in a position facing the knees of the vehicle occupant, so that even in the case of a second impact possibly taking place after the first impact, the legs of the vehicle occupant are not endangered by a loose knee protector plate situated in an undefined position.

FIG. 4 shows the sheet metal blank which is used for the production of the knee protector plate 12 and the limiting straps 16 or respectively 18. On the rectangular knee protector plate 12, material tongues are formed which form the limiting straps 16 or respectively 18. In order to achieve the assembled state of the knee protector plate 12 and of the limiting straps 16 or respectively 18 illustrated in FIG. 3, the limiting straps 16 or respectively 18 are folded along the dashed lines illustrated in FIG. 4. As is illustrated by way of example on an outer limiting strap 16, the limiting strap is arranged by the folding process into three sections: A first section 24 is folded in the plane of FIG. 4 downwards onto the knee protector plate 12. Thereupon, a second section 26 is folded upwards onto the first section 24, and finally the fastening section 20 is bent at right angles to the second section 26. The knee protector plate 12 is then bent further in its central region, so that the state shown in FIG. 3 is reached and the fastening sections 20 or respectively 22 can be secured on the base. The knee protector plate 12, ready to be installed, with the limiting straps 16 and 18 can thereby be produced ready for installation by simply cutting out a metal sheet and subsequent folding.

Figure 5:
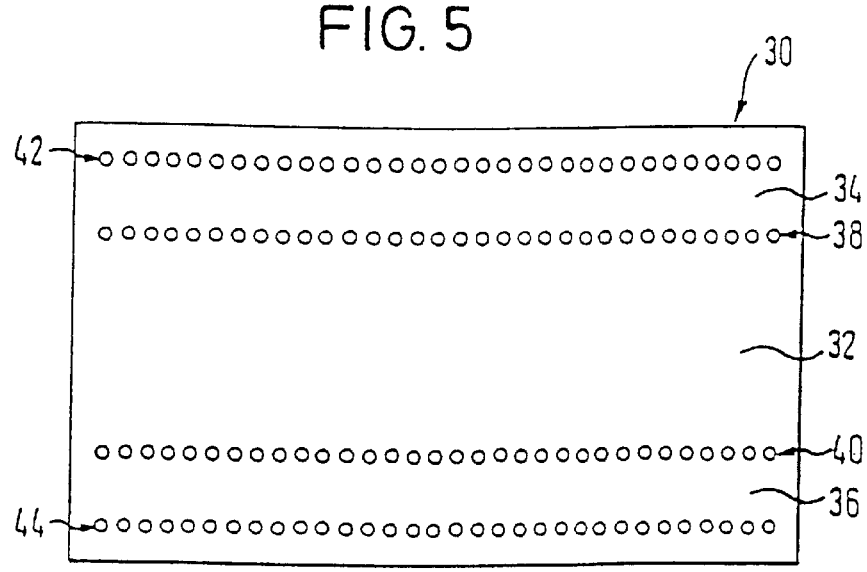
FIG. 5 shows a top view onto a material blank for a knee restraint device according to a second embodiment of the invention.

In FIG. 5 a material blank 30 is shown, from which a knee protector component 32 and limiting- and positioning means which are constructed as regions 34 and 36 of the rectangular material blank, are produced. The knee protector component 32 is respectively separated by a perforation line 38 or respectively 40 from the region 34 or respectively 36. The regions 34 or respectively 36 are in turn divided by respectively a further perforation line 42 or respectively 44 into sections, so that the regions 34 and 36 can be folded and arranged for installation in a vehicle behind the knee protector component 32.

Figure 6A:
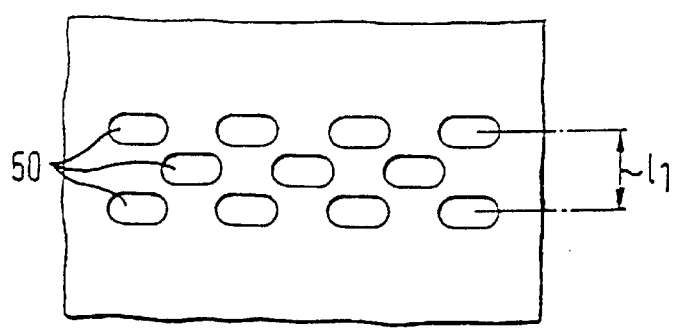
FIG. 6A shows a cut-out from a perforation line for a knee restraint device according to a further embodiment of the invention.

The cut-out of a perforation line illustrated in FIG. 6A shows its embodiment by three lines of oblong holes 50 arranged staggered with respect to each other. In the non-deformed state shown in FIG. 6A, a distance $1_1$ lies between the uppermost and the lowest row of oblong holes. Perforation lines of the type shown in FIG. 6A can be arranged for example at the site of the perforation lines shown in FIG. 5.

Figure 6B:
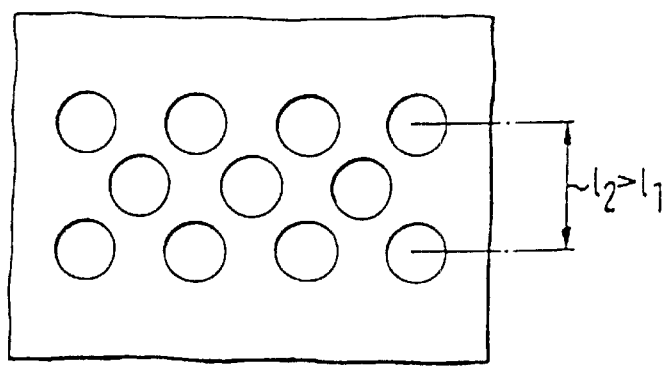
FIG. 6B shows the perforation line of FIG. 6A in deformed state.

FIG. 6B shows the perforation line of FIG. 6A in deformed state after the knee protector component has been moved toward the knees of a vehicle occupant and has reached its end position. Shortly before reaching the end position of the knee protector component, the limiting- and positioning means are unfolded, so that the movement of the knee protector component is braked. During braking, the material expands between the oblong holes 50 shown in FIG. 6A, so that these are given a substantially circular shape, as is illustrated in FIG. 6B. Through this material expansion, the knee protector component is not suddenly braked, so that the stressing for the limiting- and positioning means themselves and for their fastenings to the vehicle structure is reduced. After the material expansion, a distance 12 lies between the uppermost and lowest row of holes, which is greater than the distance $1_1$ present in the non-deformed state.

Figure 7:
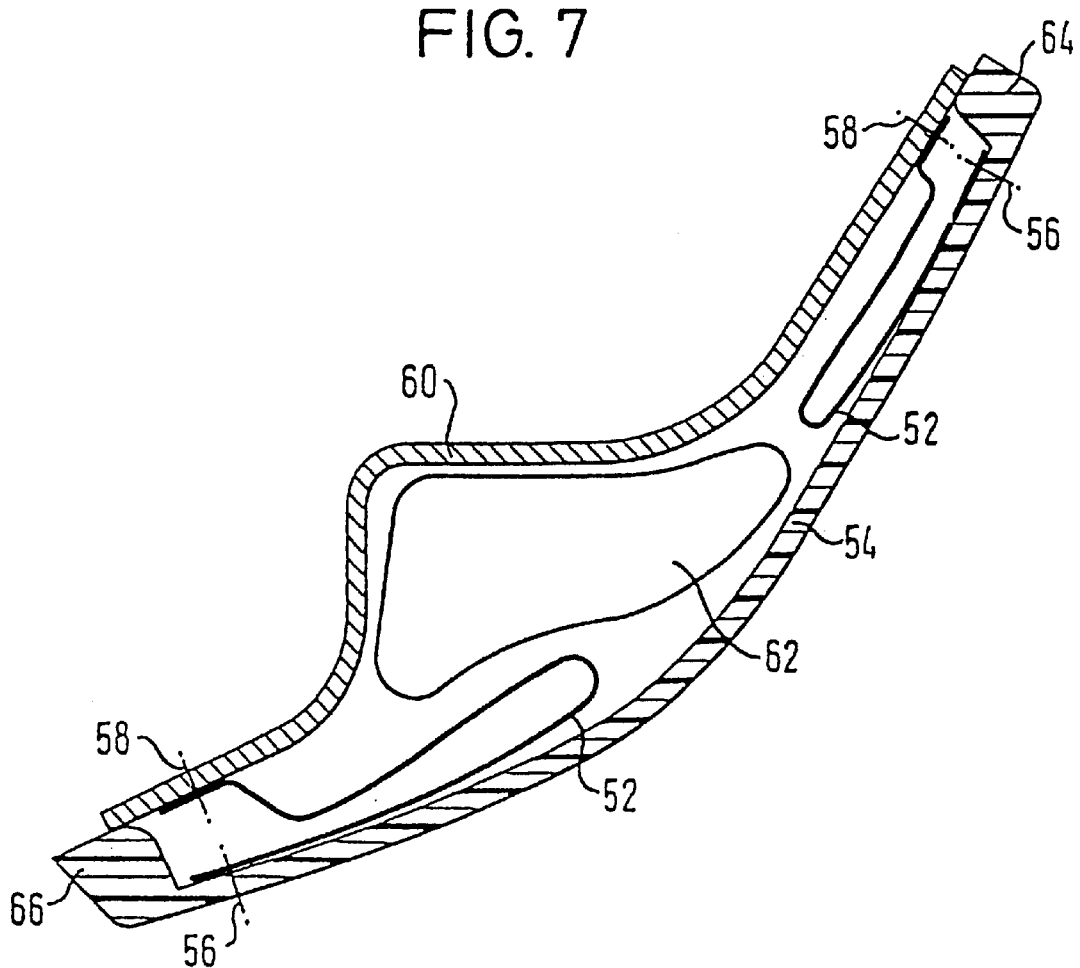
FIG. 7 shows a sectional view of a further embodiment of the knee restraint device according to the invention, in the state of rest.

In the embodiment of the knee restraint device according to the invention, shown in FIGS. 7 and 8, limiting straps 52 are constructed as separate components from the knee protector plate 54. The limiting straps 52 consist of sheet metal strips and are fastened by means of diagrammatically indicated rivets 56 to the knee protector plate 54. The knee protector plate 54 consists of light but strong plastic or of aluminum, so that upon an activation of the knee restraint system only small masses are to be moved and the system responds quickly. A construction of the knee protector plate from a metal which has plastic molded or foamed around it is likewise possible. At the ends facing away from the knee protector plate 54, the limiting straps 52 are fastened to a base 60 with rivets 58, likewise only indicated diagrammatically. A gas bag 62 is arranged as drive means between base 60 and knee protector plate 54.

The sheet metal strips used for the production of the limiting straps 52 have rounded, deburred edges, so that a damage to the gas bag 62 and an endangering of the occupants is avoided. These sheet metal strips are bent in the shape shown in FIG. 7 and in this bent state have a rigidity which is sufficient to keep the upper edge 64 and the lower edge 66 of the knee protector plate 54 in abutment against the base 60 in the state of rest of the knee restraint device, which is illustrated in FIG. 7.

FIG. 8 shows the knee restraint device of FIG. 7 in activated state. The gas bag 62 has unfolded after activation of a conventional gas generator, not illustrated, and has thereby moved the knee protector plate 54 toward the knees of a vehicle occupant. In so doing, the limiting straps 52 were deformed plastically. In the course of the forward movement of the occupant taking place in the case of a vehicle impact, the knees of a vehicle occupant then strike onto the knee protector plate 54 and this is moved again toward the base 60, a counter-force and the desired energy dissipation being caused principally by the filled gas bag 62. With this movement of the knee protector plate 54 toward the base 60, the limiting straps 52 are deformed plastically again. In this preferred embodiment, the limiting straps here have a rigidity also in their deformed state which is sufficient to keep the knee protector plate in a position reached after having protected the knees of a vehicle occupant. Also after completion of the restraining process, the knee protector plate is thereby held and, for example in a secondary crash, is not thrown around, whereby injuries could be caused to the occupant.

What is claimed is:

1. A knee restraint device for vehicles, said knee restraint device comprising a base, a knee protector component which is movable toward the knees of a vehicle occupant and against which a knee of a vehicle occupant may impact, a drive means for driving said knee protector component toward the knees of a vehicle occupant, said drive means being arranged between said base and said knee protector component, and limiting-and positioning means for limiting movement of said knee protector component towards the knees of a vehicle occupant and for positioning said knee protector component relative to the knees of a vehicle occupant, said limiting-and positioning means being constructed in one piece with said knee protector component, said limiting-and positioning means being deformable on activation of said drive means and having a predetermined weight and a predetermined rigidity, said rigidity preventing any change in shape of said limiting-and positioning means, said rigidity being overcome by a force exceeding the weight of said limiting-and positioning means.

2. The knee restraint device of claim 1, wherein said limiting-and positioning means include at least one limiting strap, said limiting strap and said knee protector component being produced from a single material blank.

3. The knee restraint device of claim 2, wherein said material blank has formed-on material tongues which form said limiting strap.

4. The knee restraint device of claim 3, wherein said material tongues are divided into sections which are separated from each other by perforation lines.

5. The knee restraint device of claim 4, wherein said perforation lines are formed by oblong holes.

6. The knee restraint device of claim 3, wherein said material tongues are divided into sections which are separated from said knee protector component by perforation lines.

7. The knee restraint device of claim 1, wherein said limiting-and positioning means and said knee protector component are produced from a single rectangular material blank and said limiting-and positioning means are constructed as regions of said rectangular material blank separated from said knee protector component by perforation lines.

8. The knee restraint device of claim 1, wherein said limiting-and positioning means has a rigidity which is sufficient to keep said knee protector component in a position of rest.

9. The knee restraint device of claim 1, wherein said limiting-and positioning means is plastically deformable.

10. The knee restraint device of claim 9, wherein said limiting-and positioning means in a plastically deformed state has a rigidity which is sufficient to keep said knee protector component in a position reached after having protected the knees of a vehicle occupant.

11. The knee restraint device of claim it 1, wherein said drive means comprises an inflatable gas bag.

* * * * *